J. W. HARDING.
GLASS RUNNING DEVICE.
APPLICATION FILED JAN. 4, 1912.

1,065,682.

Patented June 24, 1913.

2 SHEETS—SHEET 1.

WITNESSES
G. M. Spring
L. E. Buckley

INVENTOR
John W. Harding,
by Franks Appleman, Attorney

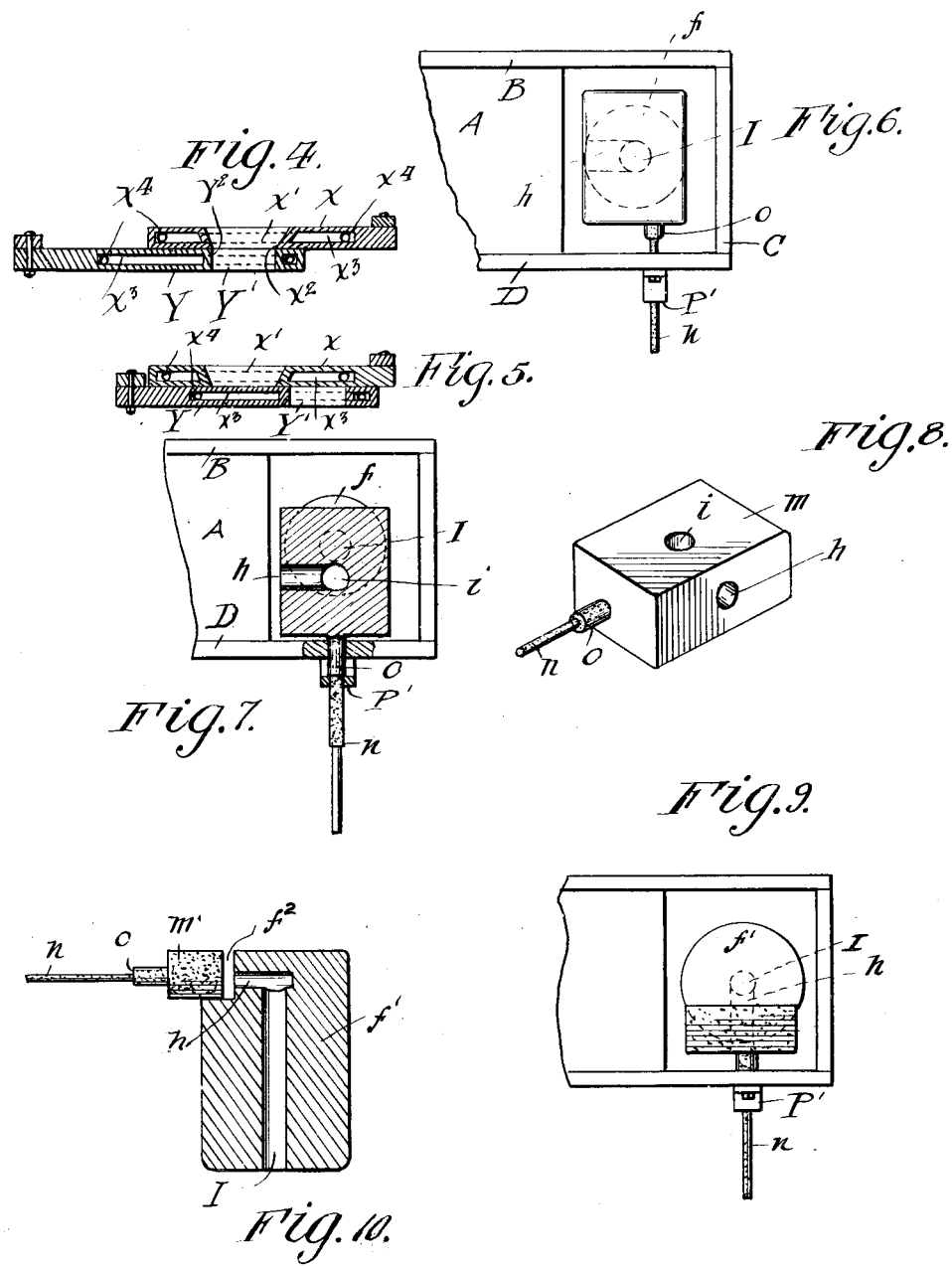

UNITED STATES PATENT OFFICE.

JOHN WILLIAM HARDING, OF BROCKWAYVILLE, PENNSYLVANIA, ASSIGNOR TO BROCKWAY MACHINE BOTTLE COMPANY, OF BROCKWAYVILLE, PENNSYLVANIA, A CORPORATION OF NEW YORK.

GLASS-RUNNING DEVICE.

1,065,682.

Specification of Letters Patent. Patented June 24, 1913.

Application filed January 4, 1912. Serial No. 669,415.

*To all whom it may concern:*

Be it known that I, JOHN WILLIAM HARDING, a citizen of the United States of America, residing at Brockwayville, Jefferson county, Pennsylvania, have invented certain new and useful Improvements in Glass-Running Devices, of which the following is a specification.

This invention relates to apparatus for running or pouring molten glass or metal.

An object of the invention is to provide an improved reservoir from which the molten glass is run, whereby only the best quality of glass is employed in the article being manufactured, while the glass of inferior quality remains in the reservoir until removed by manually operated means.

A further object is to provide an improved removable gate and nozzle, in connection with the reservoir, through which the glass runs.

A still further object is to provide an improved shearing or cutting device in connection with the running apparatus.

A still further object is to provide means for preventing the several parts of the shearing apparatus from becoming detrimentally heated by molten glass.

A still further object is to provide protecting means. composed of clay or the like, for preventing leakage around the nozzle, and for preventing said nozzle from becoming frozen to its seat.

With these and other objects in view the invention consists in the construction, combination and arrangement of parts to be hereinafter more fully described and claimed.

Figure 1:
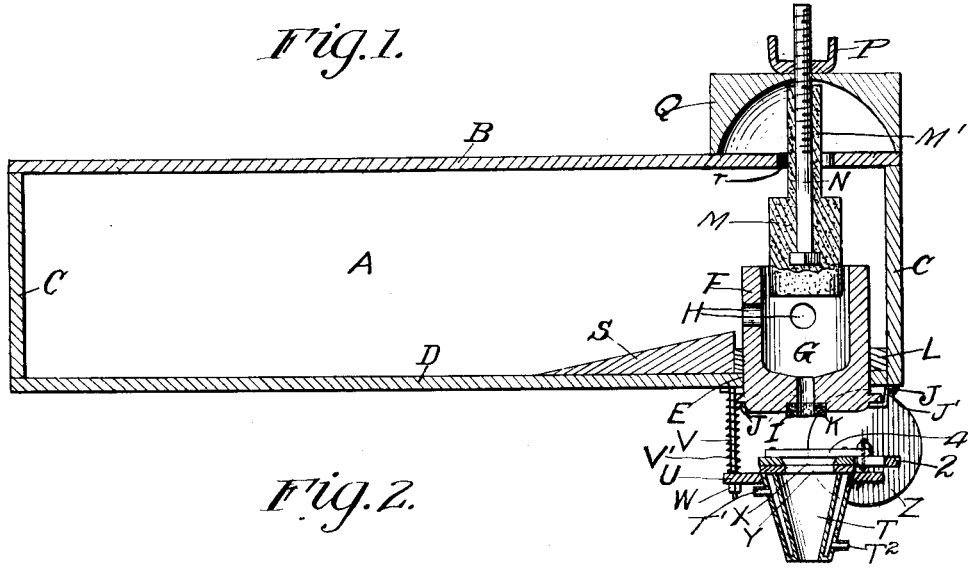
Figure 2:
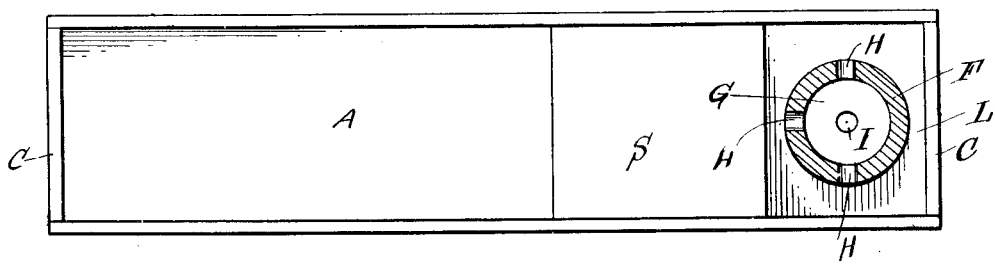
Figure 3:
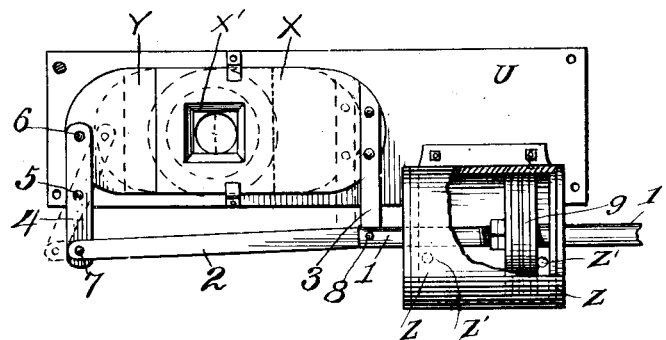

In the accompanying drawings in which similar characters of reference designate similar parts: Figure 1 is a longitudinal vertical section through the reservoir and through one form of gate and nozzle applied in connection therewith; Fig. 2 is a plan view of the reservoir and nozzle; the latter being in section; Fig. 3 is an underplan, detail view of the shearing or cutting mechanism; Fig. 4 is a longitudinal, vertical section through a pair of water-jacket shearing blades, in open position; Fig. 5 is a view similar to Fig. 4, the blades being in closed position; Fig. 6 is a fragmentary plan view, illustrating a modified form of gate and nozzle; Fig. 7 is a view similar to that shown in Fig. 6, the gate being in section, and in the closed position; Fig. 8 is a perspective view of the gate shown in Figs. 6 and 7, and Figs. 9 and 10, illustrate another modified form of gate and nozzle, in plan and vertical section, respectively.

Referring to the drawings; A designates a tank or reservoir into which molten glass is introduced from any proper source; B representing the top, C the ends, and D the bottom of the tank. The tank is apertured at E, to receive the nozzle F; the latter preferably comprising a cylindrical body having a central cavity, or gate-way G and having inlet ports H and a central outlet port I, therein. The nozzle is supported by brackets J, secured onto the under side of the reservoir by means of cap screws $j$, which engage lugs F', on the nozzle. The nozzle has a rabbet around the outlet I for receiving a protecting ring of fire-clay or the like which may be secured by any proper means.

To prevent leakage between the nozzle and the bottom D, and to prevent the glass from freezing in the joint between the nozzle and the bottom, a protecting ring L of fire-clay or the like is fitted around said nozzle. The gate-way is adapted to be closed by a gate M, through the medium of a screw-threaded shaft N and a hand screw P, seated on a metal arch Q which rests upon the cover B, which rests on the sides C of the tank. The gate M is provided with a stem M' of clay, through which the shaft N extends from its anchorage, within the gate M. The cover B has an aperture through which the stem M extends, thereby providing an annular space $r$, wherein the stem has free play, so that it will not "freeze" to the cover B; also compensating for slight variations in the position of the nozzles, when interchanged. A dam S is disposed on the bottom D and in proximity to the nozzle; the member L being interposed between said dam and nozzle, for relieving the nozzle of the pressure of the molten glass, and at the same time provide a support for the protecting ring L. An intermittent-flow mechanism, comprising a funnel T, a shearing mechanism X, Y and a shear-actuating mechanism Z, 2, etc., is movably secured to the under side of the reservoir; the funnel being in central vertical alinement with the outlet I. The supports for the intermittent-flow mechanism comprise bolts V and nuts W, one of each being shown in Fig. 1, engaging the platform U. A spring V' is carried by each of said bolts, for a purpose hereinafter specified.

As shown in Fig. 3, the shearing mechanism comprises the lower and upper blades X and Y, respectively, which are slidable in suitable guides on the platform U. These blades are preferably apertured as at X' and Y', respectively; the inner edge X² of the upper member and Y² of the lower member constituting the cutting edges. These apertures are normally in central vertical alinement with each other and with the outlet I. The blades are preferably hollow or water-jacketed as at X³; inlet and outlet ports X⁴ being provided, which may be connected in any proper manner with a source of fluid supply, for causing said fluid to circulate through the water-jacketed blades. The funnel T is also water-jacketed, and is supplied with inlet and outlet ports T' and T², respectively. The shear or cutter actuating mechanism comprises a vertical movable rod 1, a link 2, and arm 3 secured to the lower cutter blade and a lever 4 pivotally connected to the platform at 5, to the upper cutter blade at 6 and to the link 2 at 7; the rod 1, link 2, and the arm 3 being pivoted at 8. The rod may be reciprocated by means of a piston 9 in the cylinder Z, the said piston being moved by fluid pressure, which may be introduced and exhausted alternately through the ports Z¹. It may be preferable, however, to employ other means for reciprocating the rod 1, which latter extends beyond the cylinder and may be operatively connected with any other preferred proper means.

In operation the lower end of the funnel T is to be introduced into the upper end of a suitable mold which is to be filled with glass in a molten or semi-plastic state; the latter state being preferable. The gate M is adjusted according to the volume of the stream of glass to be poured, the shearing blades being in open position. When a suitable quantity of glass has flowed into the mold the stream is cut off by manipulation of the knives into the closed position, shown in Fig. 5; whereupon the platform U and its adjuncts are raised out of engagement with the mold so that said mold may be removed and another substituted therefor. During the removal and substitution of the mold, the glass continues flowing through the outlet I and accumulates upon the water-jacketed portion of the lower blade Y and is somewhat cooled by its contact with the water-jacketed blades. The blades are then reopened and the accumulated material descends through the funnel T into the mold; being further cooled by its contact with the water-jacketed funnel, and reaches the mold in a semi-liquid or semi-plastic state, and the flow is allowed to continue until the proper quantity of liquid glass has accumulated in the mold; whereupon the above described operation is repeated. The spring V operates to hold the platform U firmly upon the nuts W, and acts as a counterbalance for the opposite end of the platform which is weighted by the cylinder Z.

In lieu of the nozzle and gate mechanism shown in Fig. 1 I may employ a shorter nozzle, or one which extends but slightly above the level of the dam S; and in connection with this form of nozzle I employ a gate comprising a member having a plane under-surface movably fitted upon the top surface of the nozzle f; the plane under surface m having a port i extending upwardly thereinto and communicating with a horizontally disposed port h in one of the side surfaces of the member m. Through these ports, when in registration with the outlet I, the glass flows into the funnel T; but when the gate is in the position shown in Fig. 7, the flow of glass is cut off. To prevent the gate m from freezing to the side B a stop P' is provided to contact the shoulder o and thereby prevent contact of the members m and B. A rod or stem n constitutes a handle by which the gate may be adjusted.

In the modification shown in Figs. 9 and 10, the nozzle f' has a notch f² in one side of its top portion, and has a vertical port I, as in the other said nozzles. A horizontal port h extends through the vertical wall of the notch f² and communicates with the outlet or port I. The port h is adapted to be closed by the block or gate m¹. In this modification the stop P' and the stem n correspond to those shown in Figs. 6, 7 and 8.

It is obvious that other modified forms may substitute those described, without departure from the spirit and scope of the invention set forth in the following claims:

I claim:

1. A glass working apparatus comprising a reservoir for molten glass, the reservoir having an opening in the bottom thereof, a nozzle having an outlet port, said nozzle extending into the opening, a dam spaced from the nozzle, a protecting ring in the space, a gate adapted to operate in the nozzle, a cutting device under the nozzle, and means for limiting the movement of the gate.

2. A glass working apparatus comprising a tank for molten glass, said tank having an opening in the bottom thereof, a nozzle having a plurality of inlet openings, said nozzle being removably supported within the opening in the tank, a gate having a screw threaded portion, operating in the nozzle, a hand screw on the threaded portion of the gate for limiting the movement thereof, and means for supporting a cutting device directly on the nozzle.

3. A glass working apparatus comprising a tank for molten glass, said tank having an opening in the bottom thereof, a nozzle having an outlet port and a reduced portion adjacent the said port, one end of the nozzle extending through the opening in the tank, means for holding a protecting ring into close engagement with the nozzle, a clay ring in the reduced portion of the nozzle, a gate operating in the nozzle, means for limiting the movement of the gate, and a shearing mechanism under the nozzle.

In testimony whereof, I affix my signature in the presence of two witnesses.

JOHN WILLIAM HARDING.

Witnesses:
H. B. McCullough,
M. H. McQuade.